US 8,414,450 B2

(12) United States Patent
Ueno et al.

(10) Patent No.: US 8,414,450 B2
(45) Date of Patent: Apr. 9, 2013

(54) CONTROL APPARATUS AND METHOD FOR CONTROLLING A HYBRID VEHICLE

(75) Inventors: Muetoshi Ueno, Atsugi (JP); Masakazu Saito, Yamato (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 12/920,382

(22) PCT Filed: Feb. 27, 2009
(Under 37 CFR 1.47)

(86) PCT No.: PCT/IB2009/000375
§ 371 (c)(1),
(2), (4) Date: Jan. 11, 2011

(87) PCT Pub. No.: WO2009/109826
PCT Pub. Date: Sep. 11, 2009

(65) Prior Publication Data
US 2011/0165992 A1  Jul. 7, 2011

(30) Foreign Application Priority Data
Mar. 3, 2008  (JP) ................................ 2008-052448

(51) Int. Cl.
*B60W 10/02* (2006.01)
*B60W 10/08* (2006.01)
*F16H 61/00* (2006.01)
*G06F 7/00* (2006.01)

(52) U.S. Cl. ........... 477/5; 477/9; 477/118; 180/65.265; 701/68

(58) Field of Classification Search .................. 477/5, 9, 477/118; 180/65.265; 701/68
See application file for complete search history.

(56) References Cited

U.S. PATENT DOCUMENTS

| 5,839,533 | A  | * | 11/1998 | Mikami et al. ............... 180/165 |
| 7,104,347 | B2 | * | 9/2006 | Severinsky et al. ........ 180/65.23 |
| 2006/0243501 | A1 | | 11/2006 | Hidaka |

FOREIGN PATENT DOCUMENTS

| CN | 1876460 A | 12/2006 |
| CN | 1962334 A | 5/2007 |
| JP | 8-308015 A | 11/2000 |
| JP | 2000-320582 | 11/2000 |
| JP | 2000-320582 A | 11/2000 |
| JP | 2004-066843 | 3/2004 |
| JP | 2004-162534 A | 6/2004 |
| JP | 2006-306328 A | 11/2006 |
| JP | 2007-168565 | 7/2007 |
| JP | 2007-331599 | 12/2007 |

* cited by examiner

*Primary Examiner* — David D Le
*Assistant Examiner* — Colby M Hansen
(74) *Attorney, Agent, or Firm* — Young Basile (57) ABSTRACT

A hybrid vehicle in which a clutch is disposed between an engine and a motor/generator is controlled to suppress frequent engagement/disengagement of the clutch in a case of a coasting drive while dragging the engine. A clutch control apparatus controls the clutch and selects any one of the following drive modes: 1) an EV drive mode where the vehicle travels by only driving force of the motor/generator with the clutch disengaged; 2) an HEV drive mode where the vehicle travels by driving force of the engine and/or the motor/generator with the clutch engaged; and 3) an engine brake drive mode in which the vehicle coasts or travels by the driving force of the motor/generator while dragging the engine where the clutch is engaged, and the fuel supply is stopped when a charge of the battery is greater than or equal to a threshold value.

15 Claims, 6 Drawing Sheets

CONTROL APPARATUS AND METHOD FOR CONTROLLING A HYBRID VEHICLE

CROSS-REFERENCE TO RELATED APPLICATION

This application claims priority from Japanese Patent Application Serial No. 2008-052448, filed Mar. 3, 2008, which is incorporated herein in its entirety by reference.

TECHNICAL FIELD

The present invention relates to controlling a hybrid vehicle

BACKGROUND

A hybrid vehicle is known that has a clutch disposed between an engine and a motor/generator (MG) used for drive, start and power generation. For example, when an accelerator opening is small in such a hybrid vehicle, a fuel supply to the engine is stopped, and the clutch is disengaged. By isolating the engine from a drive transmission part including the motor/generator, an EV drive is realized. With this operation, for example, when the hybrid vehicle coasts, there is no loss of electrical energy regeneration, due to engine friction, during a deceleration regenerative power generation by the motor/generator, and a regenerative amount is secured fully and efficiently. When the hybrid vehicle coasts down a long hill with an accelerator pedal released by a driver, the MG is used as the generator, and a frequency or the number of occurrences of recovering electricity by performing the regenerative power generation increases. In this situation, it is conceivable that a situation will often occur where a battery that stores the regenerative power or electricity becomes fully charged (that is, it is conceivable that a SOC (a capacity of charge of the battery) exceeds a specified value and the regeneration becomes impossible will often occur). Thus, where the SOC exceeds the specified value, in order to prevent an overcharge of the battery, regenerative braking by the MG is controlled or restrained (or suppressed). Where the regenerative braking is restrained even though the driver releases the accelerator pedal, hybrid systems are taught in, for example, Japanese Patent Provisional Publication Nos. 2004-162534 and 2006-306328 in which a clutch arranged between the engine and the motor is engaged, and the deceleration is ensured by the engine friction.

BRIEF SUMMARY

Embodiments of a control apparatus and method for controlling a hybrid vehicle are taught herein. The hybrid vehicle includes an engine, a motor/generator and a clutch arranged between the engine and the motor/generator and capable of connecting and disconnecting the engine and the motor/generator. In one exemplary embodiment, the control apparatus comprises a controller configured to select at least one of the following driving modes as a drive mode of the hybrid vehicle: (a) an EV drive mode in which the vehicle travels by only driving force of the motor/generator with the clutch disengaged; and (b) an engine brake drive mode in which the vehicle travels while dragging the engine under a condition where the clutch is engaged and a fuel supply is stopped. The controller in this embodiment is further configured to select the engine brake drive mode and perform a coasting drive when a demand for driving force ends, and to keep the engine brake drive mode and perform a driving by the driving force of the motor/generator when a new demand for driving force is made during the coasting drive in the engine brake drive mode.

Details and variations of this embodiment and other embodiments are described in additional detail hereinafter.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

In Japanese Patent Provisional Publication Nos. 2004-162534 and 2006-306328, even when the hybrid vehicle coasts while dragging the engine with fuel cut (that is, while dragging the engine provided with no fuel) with the clutch engaged, cases often arise where acceleration is required by a little depression of an accelerator pedal, or the accelerator pedal is released again then the acceleration requirement is cancelled by the driver, in accordance with decrease of the vehicle speed resulting from a road condition and its surrounding traffic flow (e.g., decrease of road grade or gradient, change of the road from downhill to flat road or uphill). That is, even in the case of the coasting drive, the driver keeps the vehicle speed according to the surrounding traffic flow by slightly performing accelerator operations. In such hybrid vehicles, since the clutch has originally been engaged to ensure the deceleration, clutch engagement is temporarily disengaged in accordance with some depression of the accelerator pedal, and by the accelerator operation, engagement/disengagement of the clutch is repeated frequently. This causes occurrence engagement/disengagement shock, which results in a loss of comfort to occupants.

In contrast, embodiments of the invention are capable of suppressing the frequent engagement/disengagement of the clutch disposed between the engine and the motor/generator (MG) of a hybrid vehicle where the vehicle coasts while dragging the engine with fuel cut. According to the teachings herein, even when the vehicle travels by the driving force of the motor/generator by re-acceleration from the coasting drive (deceleration) while dragging the engine, the clutch remains engaged, and repetitions of clutch engagement/disengagement due to accelerator operation can be suppressed. Shock to occupants cause by clutch engagement/disengagement is reduced.

Figure 1:
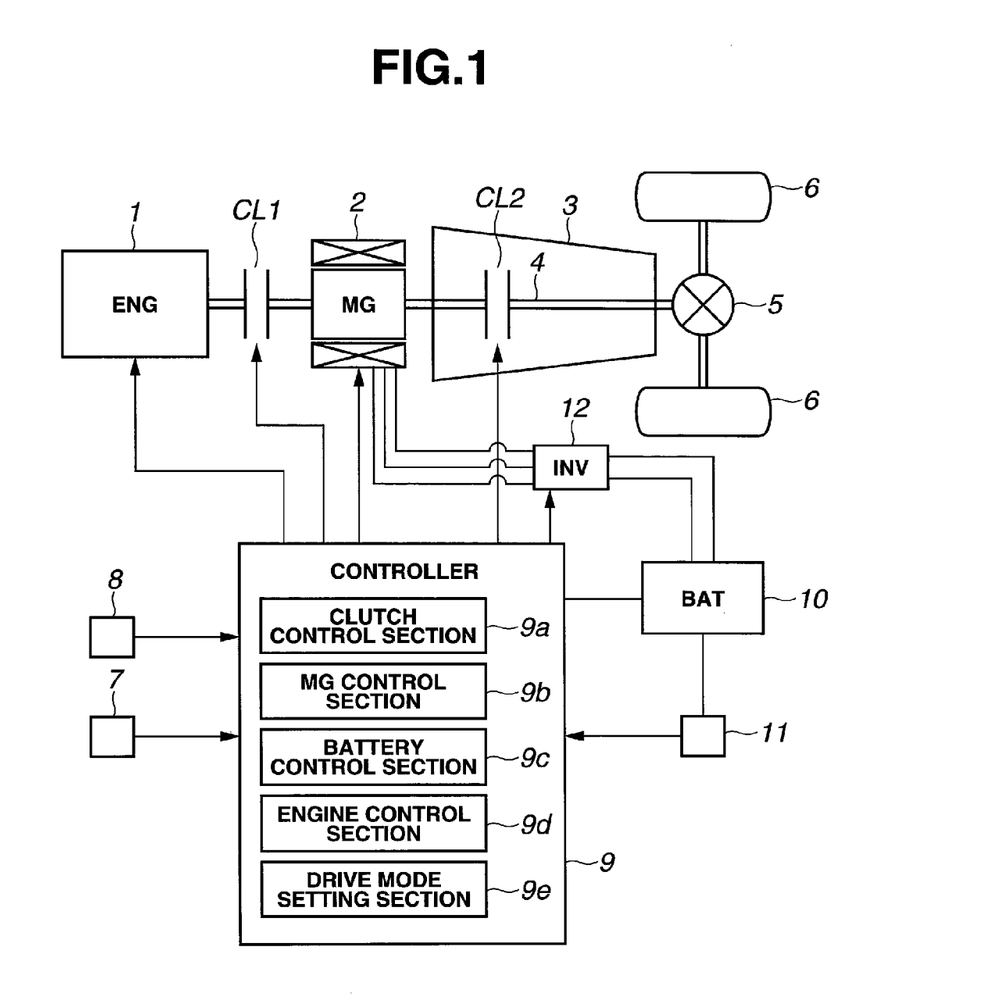
FIG. 1 is a schematic system diagram of the hybrid vehicle provided with a clutch control apparatus according to an embodiment of the invention.

Hereinafter, certain embodiments of the invention are explained in detail with reference to the drawings. As shown in FIG. 1, the hybrid vehicle has a combination of an engine 1, a motor/generator 2 and a transmission 3. Here, for example, the transmission 3 is a fixed ratio automatic transmission. A first clutch CL1 is disposed between the engine 1 and the motor/generator 2. The first clutch CL1 is capable of connecting/disconnecting a driving force and friction from the engine 1. The motor/generator 2 works as an electric motor when receiving power supply from a battery 10 through an inverter 12, and the motor/generator 2 has the function of driving a driving wheel 6 via the transmission 3, a propeller shaft 4 and a differential gear 5. A second clutch CL2 is a clutch that is used also as a frictional clutch element for shift, provided inside the transmission 3 in this embodiment, and the second clutch CL2 controls transmission of torque between the motor/generator 2 and the driving wheel(s) 6.

With respect to the motor/generator 2, when the motor/generator 2 is dragged and rotated by the driving wheel 6 through the differential gear 5, the propeller shaft 4 and the transmission 3, the motor/generator 2 can work as the power generator, and the battery 10 is charged with power generated by the motor/generator 2 through the inverter 12. That is, the motor/generator 2 works as an electric motor and a power generator.

The first clutch CL1, the second clutch CL2 and the motor/generator 2 are controlled by a controller 9. With regard to the controller 9, sensors such as an accelerator position sensor 7 that detects an accelerator opening (APO) and a vehicle speed sensor 8 that detects travelling speed of the vehicle are connected to an input side of the controller 9. Further, the battery 10 is equipped with a battery sensor 11, and the battery sensor 11 measures or checks a SOC (a capacity of charge of the battery) and sends the measured SOC to the controller 9. The controller 9 controls the engine 1, the first clutch CL1, the motor/generator 2 and the second clutch CL2 on the basis of the input signals from these sensors.

The controller 9 has a clutch control section 9a, an MG control section 9b, a battery control section 9c, an engine control section 9d and a drive mode setting section 9e. The controller 9 is implemented by, for example, a conventional engine control unit such as is known in the art. It can thus be a microcomputer including a random access memory (RAM), a read-only memory (ROM) and a central processing unit (CPU), along with various input and output connections. Generally, the control functions described herein and associated with the respective control sections are performed by execution by the CPU of one or more software programs stored in ROM. Of course, some or all of the functions can be implemented by hardware components. Moreover, although several control sections are shown as being part of an integrated controller 9, the functions for the sections could be performed by a plurality of logically-linked controllers.

The drive mode setting section 9e sets any one drive mode as a drive mode of the hybrid vehicle from the following modes: 1) an EV drive mode (electric drive mode) in which the vehicle travels by only driving force of the motor/generator (MG) 2 under a condition where the first clutch CL1 is disengaged and the engine 1 and the motor/generator 2 are isolated; 2) an HEV drive mode (hybrid drive mode) in which the vehicle travels by at least driving force of the engine 1 under a condition where the first clutch CL1 is engaged and the engine 1 and the motor/generator 2 are connected; and 3) an engine brake drive mode in which the vehicle coasts (i.e., while the engine brake is being applied) or travels by the driving force of the motor/generator 2 while dragging the engine under a condition where the clutch CL1 is engaged and the engine 1 and the motor/generator 2 are connected and fuel supply is stopped. Here, "dragging the engine" means that the engine, which is provided with no fuel and produces no driving force, is rotated by the driving wheel 6 or the motor/generator 2 through the first clutch CL1. When the engine 1 provided with no fuel is rotated by the driving wheel 6 or the motor/generator 2, the engine 1, having its own inertia, operates as engine braking and reduces the vehicle speed.

The MG control section 9b drives power running/regenerative operation of the motor/generator 2 according to the set drive mode and a required driving force, etc. The clutch control section 9a controls the engagement/disengagement of the first clutch CL1 and the second clutch CL2 according to the drive mode set by the drive mode setting section 9e. The battery control section 9c gets the SOC of the battery 10 measured by the battery sensor 11 and controls an amount of charge and discharge of the battery 10. Where there exists a high SOC value that exceeds a specified value by which the charge by regenerative power generation should be forbidden, the battery control section 9c provides this information to the drive mode setting section 9e. In such a case, the drive mode setting section 9e sets the drive mode to the engine brake drive mode. In this engine brake drive mode, the regenerative operation (the charge) during the coasting drive is restrained or suppressed; instead, the mode is set to the engine brake drive mode in which the vehicle coasts while dragging the engine (namely while the engine brake is being applied) with the first clutch CL1 engaged (with the engine and the motor/generator connected) and with the fuel supply stopped. In accordance with the drive mode set by the drive mode setting section 9e, the clutch control section 9a engages the first clutch CL1. Here, under the engine brake drive mode, since even if an acceleration requirement arises, the re-acceleration is performed by the driving force of the motor/generator while dragging the engine. Also, the repetition of the engagement/disengagement of the clutch CL1 due to acceleration ON/OFF of the driver's operation can be suppressed, and it is possible to minimize an adverse effect on the occupants.

Figure 2A:
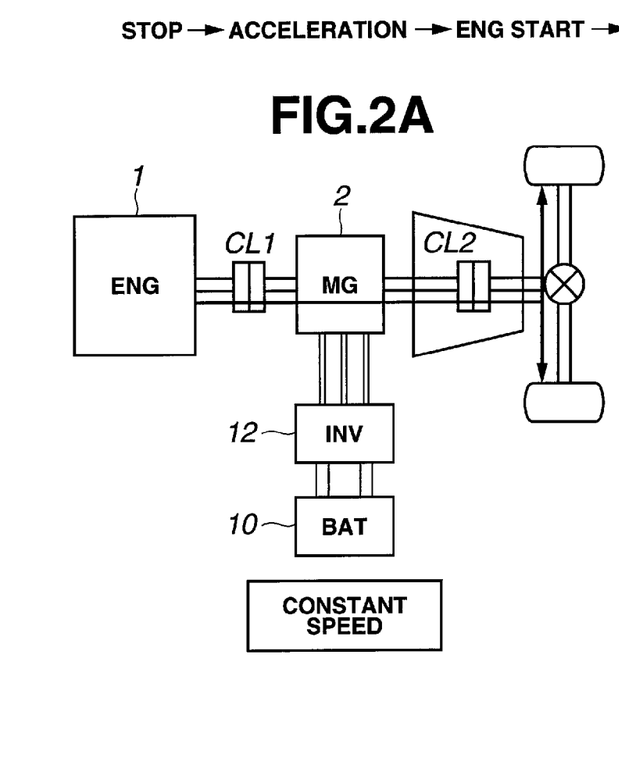
FIGS. 2A and 2B are drawings explaining engagement/disengagement of the clutch where the vehicle decelerates from a constant speed.
Figure 2B:
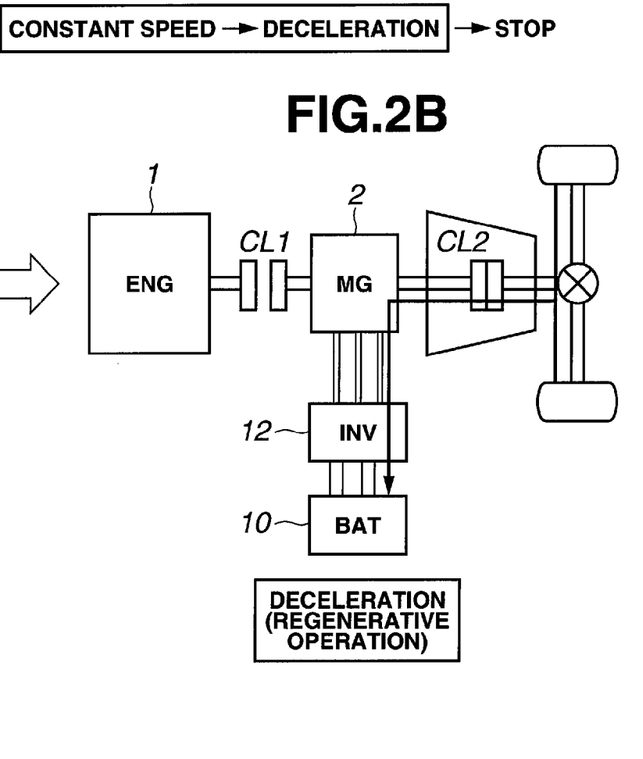

To aid the understanding of the present invention, clutch engagement/disengagement of the hybrid vehicle having the first and second clutches CL1, CL2 shown in FIG. 1 will be explained under each condition. As shown in FIGS. 2A and 2B, this hybrid vehicle has the engine 1, the first clutch CL1, the second clutch CL2, the motor/generator 2, the inverter 12 and the battery 10. At a stop state, the first clutch CL1 is disengaged, and the second clutch CL2 is engaged. During acceleration, DC power of the battery 10 is converted to three-phase AC current through the inverter 12 and rotates the motor/generator 2. A driving force produced by this rotation is then transmitted to the driving wheel 6 via the second clutch CL2.

FIG. 2A shows a state in which the vehicle travels at constant speed while each of the first and second clutches CL1, CL2 is completely engaged. When the accelerator pedal is released from such constant speed, in a case where the SOC is in a normal condition, as shown in FIG. 2B, the drive shifts to the coasting drive in the EV mode, and the first clutch CL1 is disengaged. Motor/generator 2 works as the power generator, and the AC power is converted to DC power through the inverter 12 to charge the battery 10. That is, at deceleration, a regenerative operation in which the battery 10 is charged is operated.

Figure 3A:
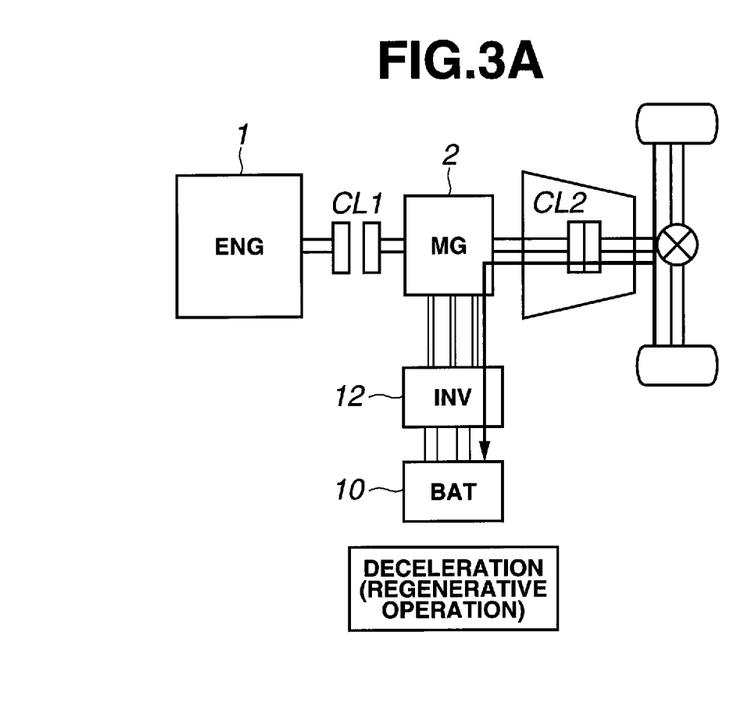
FIGS. 3A and 3B are drawings explaining engagement/disengagement of the clutch where an operation shifts to an engine dragging coasting operation at a high SOC during the deceleration.
Figure 3B:
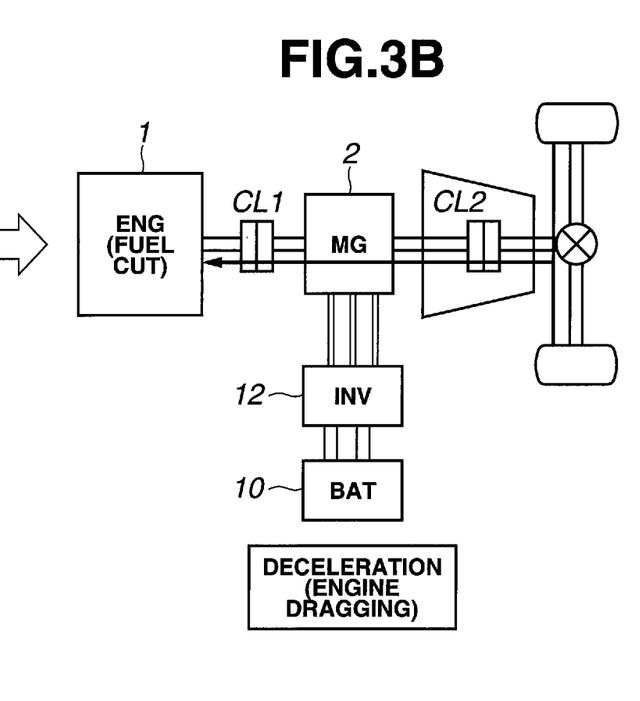

FIGS. 3A and 3B explain a condition of the clutch engagement/disengagement in operating conditions where the drive shifts to a coasting operation in the engine brake drive mode under a high SOC state at deceleration. FIG. 3A is the coasting drive in the EV mode explained above in FIG. 2B. Where the battery 10 is in the high SOC state (a fully charged condition and a charge prohibition state) in which the SOC exceeds the specified value when the regenerative operation to the battery 10 is operated while being decelerated or when the accelerator pedal is released, in order to perform deceleration without regenerating the power to the battery 10, as shown in FIG. 3B, the drive shifts to the coasting drive in the engine brake drive mode, and the first clutch CL1 is engaged. As a result, an operation in which the engine is dragged with no fuel supply to the engine 1 is carried out. That is, the coasting drive is performed by the engine brake.

Figure 4A:
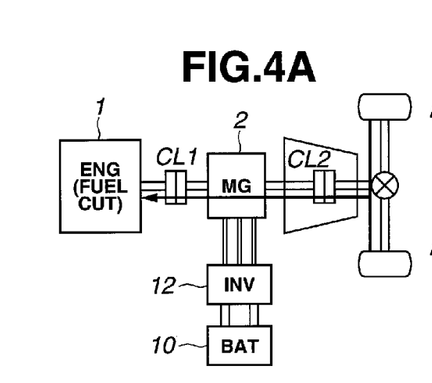
FIGS. 4A to 4D are drawings explaining engagement/disengagement of the clutch where the operation shifts to re-acceleration from the engine dragging coasting operation at the high SOC.
Figure 4B:
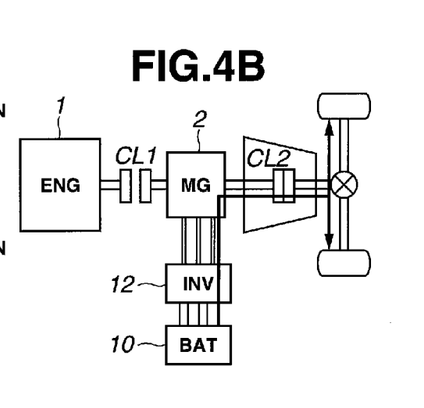

FIGS. 4A through 4D explain a condition of the clutch engagement/disengagement in operating conditions where the operation shifts from the coasting drive in the engine brake drive mode at high SOC to re-acceleration. FIG. 4A is the coasting drive in the engine brake drive mode explained above in FIG. 3B. Conditions occur where the driver depresses the accelerator pedal (acceleration ON), and an acceleration requirement arises at the coasting drive in the engine brake drive mode shown in FIG. 4A. Where this acceleration requirement is not so large that an engine start is required, known hybrid vehicles, in response to the acceleration requirement, shift the drive to FIG. 4B. An operation that disengages the first clutch CL1 and performs the acceleration by the driving force of the motor/generator 2 using the power from the battery 10 is carried out. However, the driver has a tendency to perform the slight accelerator operation in accordance with surrounding traffic flow or change of road grade or gradient etc. Thus, in a case where the driver takes his/her foot off the accelerator pedal (acceleration OFF) in the state of FIG. 4B, the drive returns to FIG. 4A, and the first clutch CL1 is engaged again. Due to this operation, when the drive goes and returns between FIGS. 4A and 4B, the engagement/disengagement of the first clutch CL1 is repeated, and this reduces comfort of the occupants.

Figure 4C:
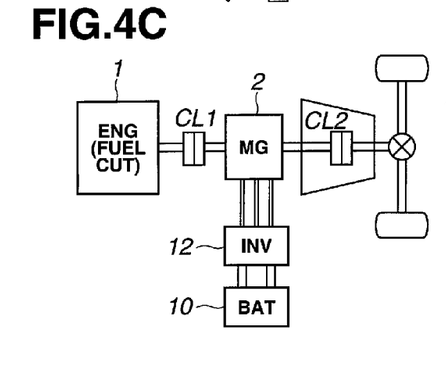
Figure 4D:
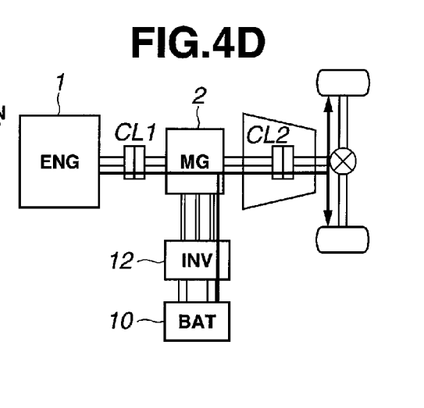

Hence, according to one embodiment of the invention, where the acceleration is performed from the coasting drive in the engine brake drive mode at the high SOC as shown in FIG. 4A, as shown in FIG. 4C, by maintaining the engagement of the first clutch CL1 and continuing the engine brake drive mode, the loss of comfort occupants feel or suffer can be prevented. Here, since the engine 1 is dragged, more torque is required at acceleration, and the power of the battery 10 is consumed by an amount of energy equivalent to the engine dragging. However, since the battery 10 is in the high SOC state, even if some power of the battery 10 is consumed, its effect is small. Conversely, by consuming the power of the battery 10, the battery 10 can be led to a more favorable charge state. Furthermore, since the disengagement of the first clutch CL1 is suppressed or restrained, the comfortableness that the occupants feel is increased, then double effects can be gained. When a further acceleration requirement arises, as shown in FIG. 4D, the engine 1 is started with the first clutch CL1 remaining engaged, and the drive can shift to the HEV drive. Although the engagement of the first clutch CL1 is needed when the drive shifts from FIG. 4B to FIG. 4D, in the case where the drive shifts from FIG. 4C to FIG. 4D, since the engagement of the first clutch CL1 can be maintained, this is further favorable.

Figure 5:
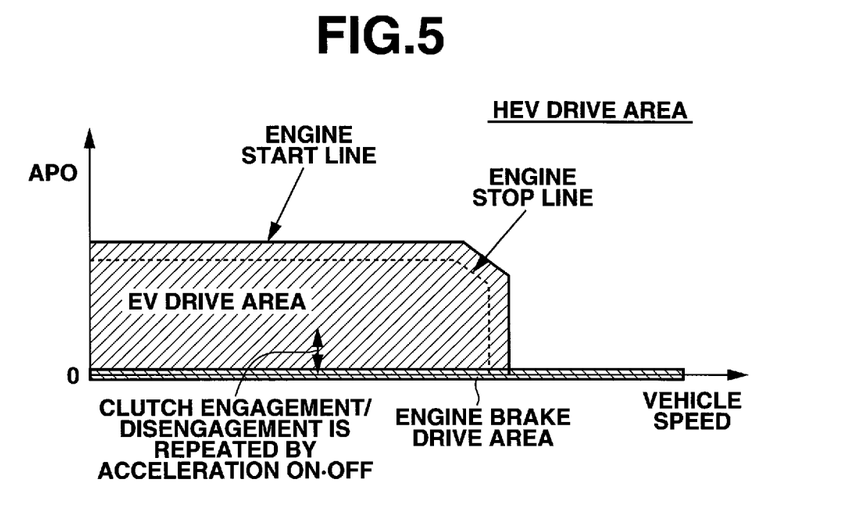
FIG. 5 is a drive area map defined by an accelerator opening (APO) and a vehicle speed of a comparative example.

FIG. 5 is a drive area map defined by the accelerator opening (APO) and the vehicle speed of a comparative example. As shown in FIG. 5, in this comparative example, when the accelerator pedal is released in an EV drive area in a state in which the battery 10 is in the high SOC state, the clutch connecting the engine and the motor is engaged, and the area shifts to an engine brake drive area. However, when the accelerator pedal is released, the area returns to the EV drive area. That is to say, by the acceleration ON/OFF, the clutch engagement/disengagement is repeated, and the occupants suffer the shock of clutch engagement/disengagement at every engagement/disengagement.

Figure 6:
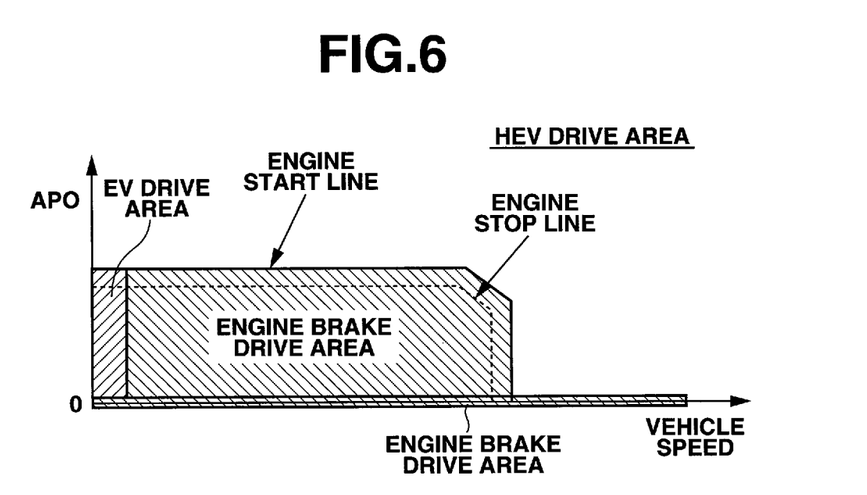
FIG. 6 is a drive area map defined by an accelerator opening (APO) and a vehicle speed according to one embodiment of the invention.

FIG. 6 is a drive area map defined by the accelerator opening (APO) and the vehicle speed according to one embodiment of the invention. In the present embodiment, once the first clutch CL1 is engaged and the area shifts to the engine brake drive area (mode) at the high SOC, as shown in FIG. 6, a part of "the EV drive area" of FIG. 5 (excluding a low speed side) is set to the engine brake drive area. By reconfiguring the area, the clutch engagement/disengagement due to the acceleration ON/OFF can be suppressed, and it is possible to continue the engine brake drive area (mode). With such a reconfiguration where a large part of the EV drive area is set to the engine brake drive area, where the acceleration continues and the accelerator opening becomes large or the vehicle speed increases, since the engagement of the first clutch CL1 continues being maintained when the area shifts to a HEV drive area, there is no need to perform the engagement operation of the first clutch CL1 upon the shift to the HEV drive area.

As described above, although this embodiment has been explained by the setting of the drive mode or the drive area, the invention can be explained by an embodiment setting an establishment condition of clutch engagement at the high SOC or an establishment condition canceling the engagement requirement.

According to one embodiment of the invention, when all the following conditions are established, "the high SOC clutch engagement requirement ON" is judged:
  establishment condition 1: SOC≧SOC threshold value A;
  establishment condition 2: vehicle speed≧vehicle speed threshold value A; and
  establishment condition 3: current state is coasting state.

According to one embodiment of the invention, when any one of the following cancel conditions is established, "the high SOC clutch engagement requirement OFF" is judged:
  cancel condition 1: HEV drive mode, and SOC<SOC threshold value B (where SOC threshold value B<SOC threshold value A); or
  cancel condition 2: vehicle speed<vehicle speed threshold value B (where vehicle speed threshold value B<vehicle speed threshold value A).

According to another embodiment of the invention, when any one of the following cancel conditions is established, "the high SOC clutch engagement requirement OFF" is judged:
  cancel condition 1: SOC<SOC threshold value B (where SOC threshold value B<SOC threshold value A);
  cancel condition 2: APO≧APO threshold value A, and EV drive permission judgment lasts more than a certain threshold time (By setting a condition of APO, permission is suppressed or restrained to perform first clutch CL1 OFF and to shift to the EV drive); or
  cancel condition 3: vehicle speed<vehicle speed threshold value B (where, vehicle speed threshold value B<vehicle speed threshold value A).

By setting these establishment and cancel conditions, the same operation and effects as the setting of the drive mode or the drive area can be obtained.

Figure 7:
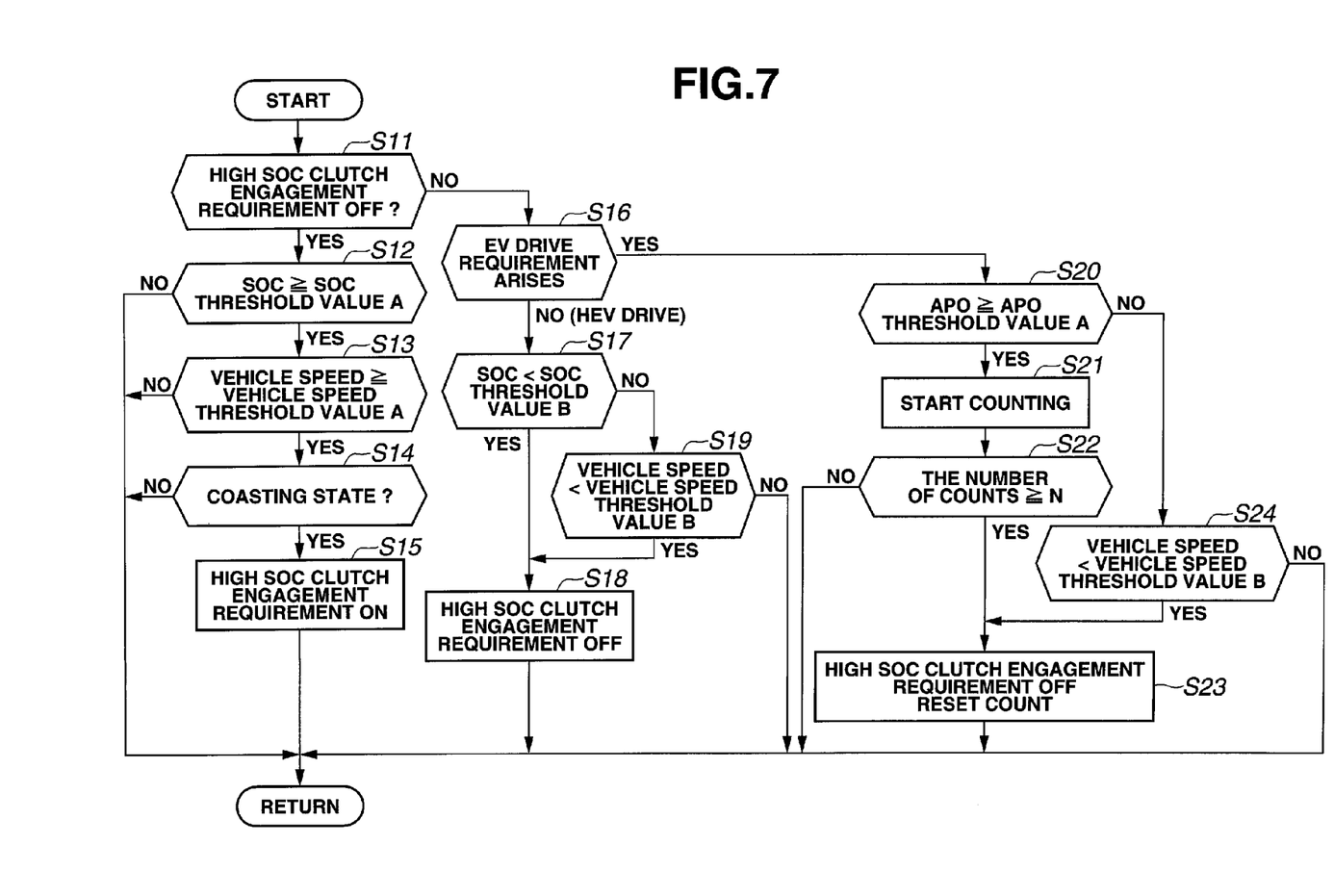
FIG. 7 is a flow chart showing control performed in the clutch control apparatus of the hybrid vehicle according to one embodiment of the invention.

FIG. 7 is a flow chart showing a control performed in the clutch control apparatus (that is, controller 9) of the hybrid vehicle according to one embodiment of the invention. As shown in FIG. 7, at step S11, a judgment is made as to whether the high SOC clutch engagement requirement is OFF. If the high SOC clutch engagement requirement is OFF, at step S12, a judgment of whether or not SOC≧SOC threshold value A, which is the establishment condition 1, is made. At step S13, a judgment of whether or not vehicle speed≧vehicle speed threshold value A, which is the establishment condition 2, is made. At step S14, a judgment of whether or not the vehicle is in the coasting state, which is the establishment condition 3, is made. If all three conditions of steps S12, S13 and S14 are satisfied, the routine proceeds to step S15, and the high SOC clutch engagement requirement ON is performed. Then the process is terminated. In a case where even one of three conditions is not satisfied, the process is ended.

At step S11, if the high SOC clutch engagement requirement is not OFF, the processes of the cancel condition judgment starting at step S16 are performed. First, at step S16, a judgment is made as to whether an EV drive requirement arises. If no EV drive requirement arises (i.e., HEV drive), a judgment of whether or not SOC<SOC threshold value B of the cancel conditions is made. If the judgment is SOC<SOC threshold value B, at step S18, the high SOC clutch engagement requirement OFF is performed, and the process is terminated. At step S17, if the judgment of SOC<SOC threshold value B is NO, the routine proceeds to step S19. At step S19, a judgment of whether or not vehicle speed<vehicle speed threshold value B of the cancel conditions is made. If vehicle speed<vehicle speed threshold value B is satisfied in step S19, the routine proceeds to step S18, where the high SOC clutch engagement requirement is turned OFF. Then the process is terminated. If instead vehicle speed is greater than or equal to vehicle speed threshold value B (i.e., the response to the judgment of step S19 is NO), the process is ended since the cancel condition is not satisfied.

At step S16, if the EV drive requirement arises, the process proceeds to step S20. At step S20, a judgment of whether or not APO≧APO threshold value A is made. If APO≧APO threshold value A, a count starts at step S21. Next, at step S22, a judgment of the number of counts compared to a value N (representing a certain time period) is made. If the number of counts≧N is satisfied, the cancel conditions have lapsed. The high SOC clutch engagement requirement is turned OFF, and the count is reset before the process is terminated. By permitting the shift to the EV drive after the certain time period has elapsed as described above, decrease of fuel economy can be avoided. Furthermore, since the shift to the EV drive mode is suppressed or restrained until the certain time period elapses, it is possible to suppress the repetition of the clutch engagement/disengagement. If the condition at step S20 is not satisfied, at step S24, a judgment of whether or not vehicle speed<vehicle speed threshold value B of the cancel conditions is made. If vehicle speed<vehicle speed threshold value B, at step S23, the high SOC clutch engagement requirement is turned OFF, and the count is reset before the process is terminated. If instead vehicle speed is greater than or equal to vehicle speed threshold value B (i.e., the response to the judgment of step S24 is NO), the process is ended since the cancel condition is not satisfied.

Modifications and variations of the embodiments described above will occur to those skilled in the art in light of the above teachings. For instance, function that resides in each component or each section or means can be rearranged within a limit of logically no contradiction. And a plurality of sections or means can be combined into one, or could be separated. Also, although the pressing of an accelerator pedal as reflected by the value of accelerator position sensor 7 is associated with a demand for driving force from the driver, and release of the accelerator pedal is associated with an end to the demand for driving force from a driver, this limitation is only for descriptive purposes. Any way of ascertaining the demand for driving force from a driver can be used with embodiments of the invention.

That is, the above described embodiments have been described in order to allow easy understanding of the present invention, and do not limit the present invention. On the contrary, the invention is intended to cover various modifications and equivalent arrangements included within the scope of the appended claims, which scope is to be accorded the broadest interpretation so as to encompass all such modifications and equivalent structures as is permitted under the law.

What is claimed is:

1. A control apparatus of a hybrid vehicle including an engine, a motor/generator and a clutch arranged between the engine and the motor/generator and capable of connecting and disconnecting the engine and the motor/generator, the control apparatus comprising:
    a controller configured to:
    select one of a plurality of driving modes as a drive mode of the hybrid vehicle, wherein the driving modes include at least:
        (a) an EV drive mode in which the vehicle travels by only driving force of the motor/generator with the clutch disengaged; and
        (b) an engine brake drive mode in which the vehicle travels while dragging the engine under a condition where the clutch is engaged and a fuel supply is stopped;
    select the engine brake drive mode and perform a coasting drive when a demand for driving force ends; and
    keep the engine brake drive mode and perform a driving by the driving force of the motor/generator when a new demand for driving force is made during the coasting drive in the engine brake drive mode.

2. The control apparatus according to claim 1 wherein the hybrid vehicle further includes a battery that supplies power to and receives power from the motor/generator; and wherein:
    the controller is configured to select the engine brake drive mode when an amount of charge of the battery is greater than or equal to a predetermined threshold value and the demand for driving force ends.

3. The control apparatus according to claim 2, wherein the driving modes include an HEV drive mode in which the vehicle travels by at least a driving force of the engine with the clutch engaged; and wherein the controller is further configured:
    to shift from the engine brake drive mode to the HEV drive mode without shifting through the EV drive mode in accordance with at least one of a vehicle speed and a desired driving force when the amount of charge of the battery is smaller than or equal to a second charge threshold value, the second charge threshold value being smaller than a first charge threshold value.

4. The control apparatus according to claim 1 wherein the hybrid vehicle further includes a battery that supplied power to and receives power from the motor/generator; and wherein:
    the controller is configured to select the engine brake drive mode when the amount of charge of the battery is greater than or equal to a first charge threshold value and a vehicle speed is greater than or equal to a first vehicle speed threshold value and a desired driving force is zero.

5. The control apparatus according to claim 1, wherein the driving modes include an HEV drive mode in which the vehicle travels by at least a driving force of the engine with the clutch engaged; and wherein the controller is further configured:
to delay a shift from the engine brake drive mode to the EV drive mode or the HEV drive mode until a duration of the engine brake drive mode exceeds a certain time.

6. The control apparatus according to claim 1, wherein the driving modes include an HEV drive mode in which the vehicle travels by at least a driving force of the engine with the clutch engaged; and wherein the controller is further configured:
to delay a shift from the engine brake drive mode to the EV drive mode or the HEV drive mode until a duration of the engine brake drive mode exceeds a certain time and a desired driving force becomes greater than or equal to a driving force threshold value.

7. The control apparatus according to claim 1, wherein the driving modes include an HEV drive mode in which the vehicle travels by at least a driving force of the engine with the clutch engaged; and wherein the controller is further configured:
to shift from the engine brake drive mode to the HEV drive mode without shifting through the EV drive mode when a desired driving force exceeds a threshold value defined according to a vehicle speed.

8. The control apparatus according to claim 1, wherein:
the controller is configured to shift from the engine brake drive mode to the EV drive mode when the engine brake drive mode is selected and a vehicle speed lowers to a speed smaller than or equal to a second vehicle speed threshold value.

9. A method of controlling a hybrid vehicle including an engine, a motor/generator and a clutch arranged between the engine and the motor/generator and capable of connecting and disconnecting the engine and the motor/generator, the method comprising:
selecting an engine brake drive mode when a demand for driving force ends, wherein the hybrid vehicle has at least the following driving modes available as a drive mode of the hybrid vehicle:
(a) an EV drive mode in which the vehicle travels by only driving force of the motor/generator with the clutch disengaged; and
(b) the engine brake drive mode in which the vehicle travels while dragging the engine under a condition where the clutch is engaged and a fuel supply is stopped;
performing a coasting drive when a demand for driving force ends and while the engine brake drive mode is selected; and
keeping the engine brake drive mode and performing a driving by the driving force of the motor/generator when a new demand for driving force is made during the coasting drive in the engine brake drive mode.

10. The method according to claim 9 wherein the hybrid vehicle further includes a battery that supplies power to and receives power from the motor/generator; and wherein selecting the engine brake drive mode further comprises selecting the engine brake drive mode when an amount of charge of the battery is greater than or equal to a predetermined threshold value and the demand for driving force ends.

11. The method according to claim 10, wherein the driving modes include an HEV drive mode in which the vehicle travels by at least a driving force of the engine with the clutch engaged, the method further comprising:
shifting from the engine brake drive mode to the HEV drive mode without shifting through the EV drive mode in accordance with at least one of a vehicle speed and a desired driving force when the amount of charge of the battery is smaller than or equal to a second charge threshold value, the second charge threshold value being smaller than a first charge threshold value.

12. The method according to claim 9 wherein the hybrid vehicle further includes a battery that supplied power to and receives power from the motor/generator; and wherein selecting the engine brake drive mode further comprises selecting the engine brake drive mode when the amount of charge of the battery is greater than or equal to a first charge threshold value and a vehicle speed is greater than or equal to a first vehicle speed threshold value and a desired driving force is zero.

13. The method according to claim 9, wherein the driving modes include an HEV drive mode in which the vehicle travels by at least a driving force of the engine with the clutch engaged, the method further comprising:
delaying a shift from the engine brake drive mode to the EV drive mode or the HEV drive mode until a duration of the engine brake drive mode exceeds a certain time and optionally until a desired driving force becomes greater than or equal to a driving force threshold value.

14. The method according to claim 9, wherein the driving modes include an HEV drive mode in which the vehicle travels by at least a driving force of the engine with the clutch engaged, the method further comprising:
shifting from the engine brake drive mode to the HEV drive mode without shifting through the EV drive mode when a desired driving force exceeds a threshold value defined according to a vehicle speed.

15. The method according to claim 9, further comprising:
shifting from the engine brake drive mode to the EV drive mode when the engine brake drive mode is selected and a vehicle speed lowers to a speed smaller than or equal to a second vehicle speed threshold value.

* * * * *